United States Patent Office 3,595,925
Patented July 27, 1971

3,595,925
FLUORINATION OF ω-HYDRO-FLUORINATED POLYETHERS
Bruce H. Garth, Newark, Del., assignor to E. I. du Pont de Nemours and Company, Wilmington, Del.
No Drawing. Filed Jan. 30, 1969, Ser. No. 795,342
Int. Cl. C07c *41/00*
U.S. Cl. 260—615                                                     8 Claims

ABSTRACT OF THE DISCLOSURE

Process for the liquid phase fluorination of hydro-end-capped polyfluorinated polyethers which comprises reacting the polyethers with antimony pentafluoride.

BACKGROUND OF THE INVENTION

(1) Field of the invention

This invention relates to the liquid phase fluorination of hydro-end-capped polyfluorinated polyethers, and more particularly to such fluorination carried out in the presence of antimony pentafluoride.

(2) Description of the prior art

Perfluorinated or nearly perfluorinated organic compounds are ordinarily exceptionally chemically and thermally stable. Thus the perfluorinated polyethers find utility as plastics, lubricants, working fluids and the like. The stability of compounds which are nearly perfluorinated, i.e., ones containing only a small number of substituent hydrogen atoms, depends upon the position of the substituent hydrogen atoms. For example, a primary omega-hydrogen atom in an otherwise perfluorinated organic compound contributes little toward instability. On the other hand, a secondary or tertiary hydrogen atom in an otherwise perfluorinated organic compound increases the instability of the compound. The process of this invention provides a means for replacing the secondary hydrogen atom in compounds of the Formula $$R'O(C_3F_6O)_zCF(CF_3)-H$$

wherein R' is a perfluorinated group of 1 through 16 carbon atoms and z is an integer of 1 to 100, with a fluorine atom to provide a more stable compound.

SUMMARY OF THE INVENTION

Process for preparing compounds of the formula (1)        $R'O(C_3F_6O)_zCF(CF_3)-F$ wherein R' is a perfluoroalkyl group of 1 through 16 carbon atoms and z is an integer of 1 to 100, which comprises reacting a compound of the formula (2)        $R'O(C_3F_6O)_zCF(CF_3)-H$ wherein R' and z are defined above, in the liquid phase with antimony pentafluoride at a temperature of between about 25° C. to about 250° C.

DESCRIPTION OF THE INVENTION

The process of this invention is a stoichometric one, requiring equivalent amounts of the polyether reactant and the antimony pentafluoride. Preferably an excess of the latter is employed to ensure complete fluorination of the polyether reactant. The process is preferably carried out under substantially anhydrous conditions since antimony pentafluoride is sensitive to moisture and other contaminants, e.g., solvent carried over from the preparation of the polyether reactant.

Ordinarily, autogeneous pressures are employed; however, any pressure may be used so long as the polyether reactant remains in the liquid state. Temperature employed may range between about 25° C. and 250° C., although 100° C. to 175° C. are preferred.

It is preferred to remove the fluorinated final product of the process as soon as practicable after its formation since the polyether fluorinated products undergo degradation in the presence of excessive amounts of antimony pentafluoride.

The examples which follow illustrate the process of this invention.

EXAMPLE 1

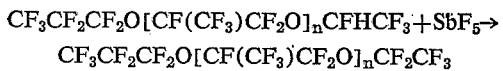

(a) $CF_3CF_2CF_2O[CF(CF_3)CF_2O]_nCFHCF_3$ (mol. wt. 4200; $n$ aver. ≅23.4) (100 g., 0.024 mol.) and antimony pentafluoride (10 g., 0.046 mol.) were combined in a nitrogen-swept 400 cc. Hastelloy C bomb. The bomb was shaken 16 hrs. at 150° C.

The infrared spectrum of the mixture showed only trace C–H absorption, indicating nearly complete conversion to fluorine end-capped material.

(b) Using a lesser proportion of antimony pentafluoride, a sample of the same hydro-end-capped polyhexafluoropropylene oxide (80 g., 0.019 mol.) was similarly treated with antimony pentafluoride (4 g., 0.015 mol.)

Hydrogen fluoride was observed in the off-gases. Nuclear magnetic resonance measurement indicated complete conversion to fluoro-end-capped product.

EXAMPLE 2

$CF_3CF_2CF_2O[CF(CF_3)CF_2O]_nCFH(CF_3)$ (mol. wt. 1200; $n$ average ≅5.4) (60g., 0.05 mol) and antimony pentafluoride (11 g., 0.05 mol) were reacted in moisture-protected reflux equipments under reaction conditions indicated as follows:

| Reaction condition | Temp., ° C. | Heating time, hrs. |
|---|---|---|
| A | 80 | 18 |
| B | 100 | 17 |
| C | 120 | 18 |

Infrared and nuclear magnetic resonance spectra indicated that the material treated under reaction condition A had a trace of hydrogen end capped polyhexafluoropropylene oxide while those materials treated under reaction conditions B and C were converted to fluorine end capped products.

EXAMPLE 3

$CF_3CF_2CF_2O[CF(CF_3)CF_2O]_nCF(CF_3)COOH(n≅5.6)$ was treated with elemental fluorine as described in Miller U.S. Pat. 3,242,218 to obtain (I)        $CF_3CF_2CF_2O[CF(CF_3)CF_2O]_nCF_2CF_3$ in 96.8 percent yield, and (II)       $CF_3CF_2CF_2O[CF(CF_3)CF_2O]_nCFH(CF_3)$ in 3.8 percent yield, as indicated by infrared and nuclear magnetic resonance measurements.

Heating of the mixture of I and II with 0.55 percent antimony pentafluoride (3.2 mol. percent) at 150° C. for 23 hours converted II to I.

The infrared analyses carried out in the examples was based on the characteristic absorption bands as follows:

(a) Fluorocarbon hydride ($R_fH$) 3.3μ (C–H)
(b) Polyhexafluoropropylene oxide 12.4μ (Backbone)
(c) Hydro-end-capped polyhexafluoropropylene oxides, i.e. those compounds having the end group, —CHFCF₃, show a characteristic absorption band at 11.1μ which is about five times as intense as the C—F absorption at 3.3μ.

The band is absent in fluorine end-capped structures having the end group —CH$_2$CF$_3$.

Interpretation of nuclear magnetic resonance (NMR) spectra carried out in the examples is based on the following assignments in the structure, $$CF_3CF_2CF_2O[CF(CF_3)CF_2O]_n\text{—}X$$

wherein X=

—CFHCF$_3$ (hydro-end-cap) 69.2 p.p.m. (doublet) 14 p.p.m. (singlet)
—CF$_2$CF$_3$ (fluoro-end-cap) 14.7 p.p.m. (singlet) 15.2 p.p.m. (distorted triplet)

The tertiary fluorine atoms of the repeating unit produce a broad band at 67.4 p.p.m. The only —CF$_2$— group not attached to an oxygen atom is in the perfluoropropoxy end group. This group produces a sharp peak at 53.75 p.p.m. The CF$_3$— and —CF$_2$O— groups of the repeating unit and of the perfluoropropoxy end group produce a broad unresolved peak 10 p.p.m. to the high field side of external standard trifluoroacetic acid. The value of $n$ is estimated by dividing the trifluoroacetic acid. The value of $n$ is estimated by dividing the area under the 67.4 p.p.m. (tertiary fluorine) peak by one-half the area under the 53.75 p.p.m. (—CF$_2$— group unattached to oxygen) peak.

The reactants employed in the process of this invention can be prepared as described in Selman et al. U.S. 3,342,875 which discloses the decarboxylation of the carboxylic acids obtained by hydrolysis of acyl fluorides of Moore et al. U.S. 3,250,808

$$(R_fO[CF(CF_3)CF_2O]_nCF(CF_3)COF)$$

to yield corresponding compounds having the end group —CFHCF$_3$.

Other compounds, in addition to the polyhexafluoropropylene oxide reactant used in Example 1 which fall within the scope of Formula 1 include those of the formula (3)    R[O—CF$_2$—CF(CF$_3$)]CFHCF$_3$ and compounds in which the group in Formula 3 within the brackets is a mixture of [O—CF$_2$—CF(CF$_3$)] and [CF(CF$_3$)—CF$_2$—O—] groups. These compounds can be prepared as described in French Pat. 1.434,537 and U.S. Pat. 3,250,806.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing compounds of the formula RF wherein R is R'O(C$_3$F$_6$O)$_z$CF(CF$_3$)— in which $z$ is an integer of 1 through 100 and R' is a perfluoroalkyl group of 1 through 16 carbon atoms;
   which comprises reacting a compound of the formula R—H wherein R is defined as above in the liquid phase with antimony pentafluoride at a temperature of between about 25° C. and about 250° C.

2. The process of claim 1 carried out under autogenous pressure and substantially anhydrous conditions.

3. The process of claim 1 wherein the antimony pentafluoride is present in approximately a stoichiometric amount.

4. The process of claim 3 carried out under substantially anhydrous conditions.

5. The process of claim 3 wherein the R—H reactant is R'O[CF(CF$_3$)CF$_2$O]$_z$CF(CF$_3$)—H.

6. The process of claim 5 wherein the R—H reactant is CF$_3$CF$_2$CF$_2$[CF(CF$_3$)CF$_2$O]$_z$CF(CF$_3$)—H.

7. The process of claim 4 wherein the R—H reactant is R'O[CF(CF$_3$CF$_2$O]$_z$CF(CF$_3$)—H.

8. The process of claim 7 wherein the R—H reactant is CF$_3$CF$_2$CF$_2$O[CF(CF$_3$)CF$_2$O]$_z$CF(CF$_3$)—H.

References Cited

McBee et al., Preparation, Properties and Technology of Fluorine and Organo Fluoro Compounds, Slesser et al., National Nuclear Energy Series, Division VII, vol. I., McGraw-Hill Book Co., New York (1951) pp. 286–292.

HOWARD T. MARS, Primary Examiner